United States Patent
Ikegawa et al.

(10) Patent No.: US 8,363,271 B2
(45) Date of Patent: Jan. 29, 2013

(54) IMAGE PROCESSING METHOD AND APPARATUS FOR EXECUTING ERROR DIFFUSION WHEN THE OBTAINED IMAGE DATA IS READ BY A SCANNER

(75) Inventors: Yoshiharu Ikegawa, Kawasaki (JP); Koki Shibao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 860 days.

(21) Appl. No.: 12/479,627

(22) Filed: Jun. 5, 2009

(65) Prior Publication Data

US 2009/0303506 A1 Dec. 10, 2009

(30) Foreign Application Priority Data

Jun. 10, 2008 (JP) ................................. 2008-151452
Jun. 20, 2008 (JP) ................................. 2008-162309

(51) Int. Cl.
*H04N 1/60* (2006.01)

(52) U.S. Cl. ...... 358/1.9; 358/3.03; 358/3.05; 358/3.06; 358/3.1; 358/3.3; 358/534; 358/535; 358/536

(58) Field of Classification Search ........................ None
See application file for complete search history.

(56) References Cited

U.S. PATENT DOCUMENTS

| | | | | |
|---|---|---|---|---|
| 5,489,997 A | * | 2/1996 | Usami | 358/522 |
| 6,747,757 B1 | * | 6/2004 | Enomoto | 358/1.9 |
| 7,046,394 B2 | * | 5/2006 | Yasunobu | 358/1.9 |
| 7,164,496 B2 | * | 1/2007 | Tatsumi | 358/1.9 |
| 7,274,478 B2 | * | 9/2007 | Oshima et al. | 358/1.15 |
| 7,395,957 B2 | * | 7/2008 | Satake | 235/375 |
| 7,599,100 B2 | * | 10/2009 | Higuchi et al. | 358/403 |
| 7,653,217 B2 | * | 1/2010 | Ikegawa | 382/112 |
| 7,912,388 B2 | * | 3/2011 | Toda | 399/45 |
| 7,930,501 B2 | * | 4/2011 | Maeda et al. | 711/163 |
| 2006/0026350 A1 | * | 2/2006 | Lee et al. | 711/115 |
| 2006/0221358 A1 | * | 10/2006 | Takahashi | 358/1.1 |
| 2008/0025642 A1 | * | 1/2008 | Kim | 382/298 |
| 2008/0071932 A1 | * | 3/2008 | Gupta | 710/5 |

FOREIGN PATENT DOCUMENTS

| | | |
|---|---|---|
| JP | 2002-359716 A | 12/2002 |
| JP | 2006-268173 A | 10/2006 |
| JP | 2007-136825 A | 6/2007 |

* cited by examiner

*Primary Examiner* — Dung Tran

(74) *Attorney, Agent, or Firm* — Canon USA Inc. IP Division

(57) ABSTRACT

A method for controlling an image processing apparatus includes obtaining image data from a detachable memory unit, estimating whether the obtained image data is image data read by a scanner, and in a case where it is estimated that the obtained image data is image data read by the scanner, performing control not to execute predetermined screen processing on the image data.

21 Claims, 11 Drawing Sheets

FIG.7

| SHEET SIZE | LONG SIDE | SHORT SIDE | ASPECT RATIO (LONG SIDE/ SHORT SIDE) |
|---|---|---|---|
| A3 SHEET | 420 | 297 | 1.41 |
| A4 SHEET | 297 | 210 | 1.41 |
| A5 SHEET | 210 | 148 | 1.42 |
| A6 SHEET | 148 | 105 | 1.41 |
| A7 SHEET | 105 | 74 | 1.42 |
| JIS B4 SHEET | 364 | 257 | 1.42 |
| JIS B5 SHEET | 257 | 182 | 1.41 |
| JIS B6 SHEET | 182 | 128 | 1.42 |
| JIS B7 SHEET | 128 | 91 | 1.41 |
| EXECUTIVE | 266.7 | 184.1 | 1.45 |
| LEDGAR | 431.8 | 279.4 | 1.55 |
| LEGAL | 355.6 | 279.4 | 1.65 |
| LETTER | 279.4 | 215.9 | 1.29 |
| OFICIO | 317.5 | 215.9 | 1.47 |
| FOLIO | 220 | 210 | 1.57 |
| AUSTRALIAN FOOLSCAP | 337 | 206 | 1.64 |
| ARGENTINE OFICIO | 340 | 220 | 1.55 |
| ARGENTINE LETTER | 280 | 220 | 1.27 |
| GOVERNMENT LETTER | 266.7 | 203.2 | 1.31 |
| GOVERNMENT LEGAL | 330.2 | 203.2 | 1.63 |

FIG.8

| Table Number | ASPECT RATIO (LONG SIDE/SHORT SIDE) |
|---|---|
| 1 | 1.27 |
| 2 | 1.29 |
| 3 | 1.31 |
| 4 | 1.41 |
| 5 | 1.42 |
| 6 | 1.45 |
| 7 | 1.47 |
| 8 | 1.55 |
| 9 | 1.57 |
| 10 | 1.63 |
| 11 | 1.64 |
| 12 | 1.65 |

FIG.11

STORAGE MEDIUM SUCH AS FD/CD-ROM

| DIRECTORY INFORMATION |
|---|
| PROGRAM CODE CORRESPONDING TO STEPS IN FLOWCHART OF FIG. 5 |
| PROGRAM CODE CORRESPONDING TO STEPS IN FLOWCHART OF FIG. 6 |
| PROGRAM CODE CORRESPONDING TO STEPS IN FLOWCHART OF FIG. 9 |
| PROGRAM CODE CORRESPONDING TO STEPS IN FLOWCHART OF FIG. 10 |

IMAGE PROCESSING METHOD AND APPARATUS FOR EXECUTING ERROR DIFFUSION WHEN THE OBTAINED IMAGE DATA IS READ BY A SCANNER

BACKGROUND OF THE INVENTION

1. Field of the Invention

The present invention relates to an image processing apparatus, a method for controlling the image processing apparatus, and a storage medium.

2. Description of the Related Art

There is a conventional image processing apparatus that can read image data from a storage medium (e.g., a USB flash memory or a memory card) and can perform printing of the read image data. If a user has a storage medium that stores image data beforehand, the user may connect the storage medium to the image processing apparatus to cause the image processing apparatus to perform printing of the image data stored in the storage medium.

For example, the above-described storage medium can store image data captured by a digital camera and image data scanned by a scanner. The image processing apparatus allows a user to perform printing of the image data stored in the storage medium without using any information processing apparatus (e.g., a personal computer (PC)).

As a method for performing halftone processing on image data, screen processing and error diffusion processing are conventionally known.

For example, in a case where image data captured by a digital camera is printed by an electrophotographic printing apparatus, an image quality of a printed product can be stabilized by performing the screen processing. On the other hand, image data scanned by a scanner may include a halftone dot image. The screen processing, if performed on a halftone dot image, may generate a moire. Accordingly, it is desired to perform the error diffusion processing on the image scanned by the scanner. For example, as discussed in Japanese Patent Application Laid-Open No. 2007-136825, there is a conventional printing technique that performs the screen processing on image data.

However, if image processing to be performed on the image data is necessary to determine whether the image data read from a storage medium is an image read by a scanner, it is necessary to install a hardware device (e.g., a dedicated circuit) on the apparatus. A cost of the apparatus may increase. Alternatively, a firmware provided in the image processing apparatus may be used to perform the determination. However, in this case, productivity of the image processing apparatus may deteriorate because it takes longer time to complete the processing.

Another method may allow a user to designate whether the image data is read by a scanner. However, in this case, the user is required to perform manual operations.

SUMMARY OF THE INVENTION

The present invention provides an image processing apparatus and a method for controlling the image processing apparatus, which can overcome the above-described problem.

The present invention relates to an image processing apparatus including an obtaining unit configured to obtain image data from a detachable memory unit, a control unit configured to execute predetermined screen processing on the obtained image data, and a presuming unit configured to estimate whether the image data obtained by the obtaining unit is image data read by a scanner, wherein in a case where the presuming unit estimates that the image data obtained by the obtaining unit is image data read by the scanner, the control unit performs control not to execute the predetermined screen processing on the obtained image data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 7 illustrates example aspect ratios of various regular-size sheets that can be processed by the image processing apparatus according to the exemplary embodiment.

FIG. 8 illustrates an example sheet size table that describes some of the aspect ratios of the regular-size sheets illustrated in FIG. 7.

FIG. 11 illustrates a memory map of a storage medium that can store various data processing programs readable by the image processing apparatus according to the present invention.

DETAILED DESCRIPTION OF THE EMBODIMENTS

Figure 1:
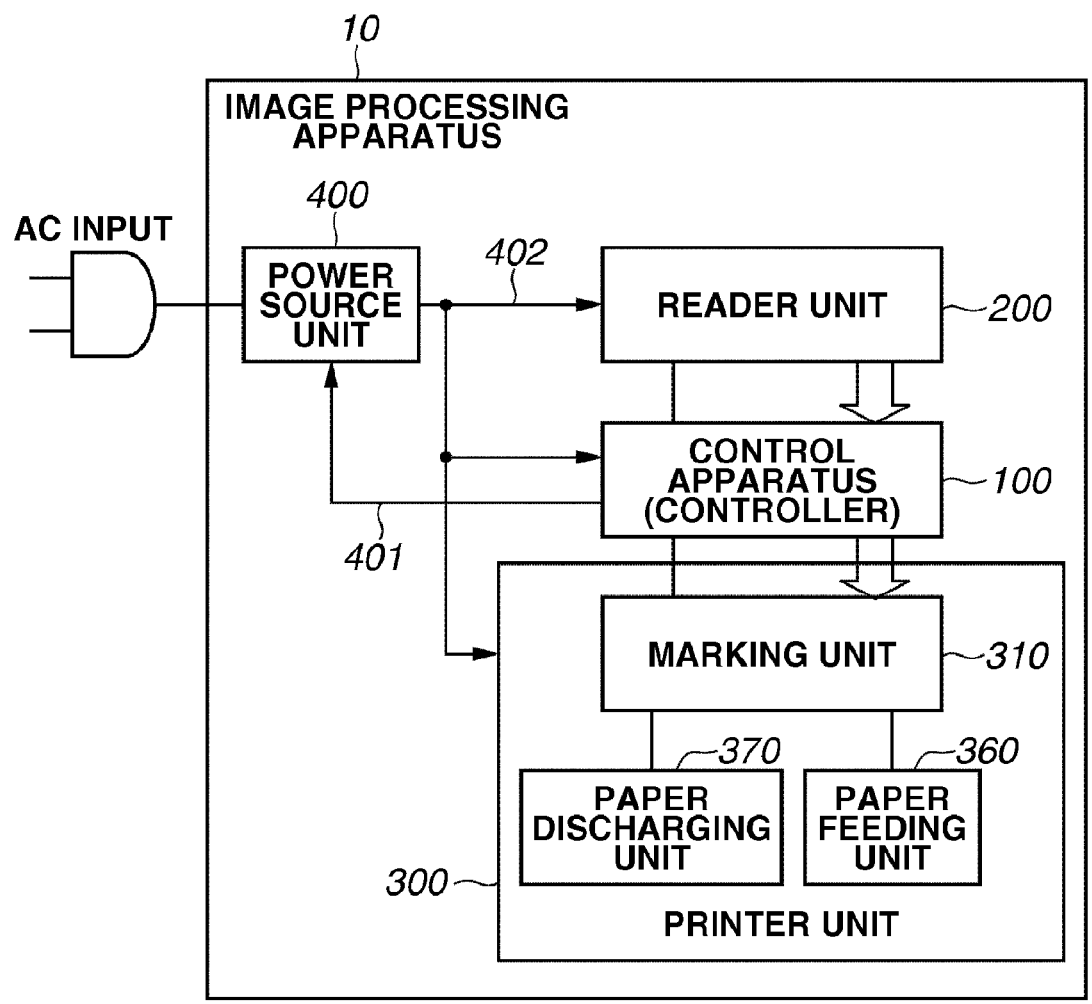
FIG. 1 is a block diagram illustrating a configuration of an image processing apparatus according to an exemplary embodiment.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Various exemplary embodiments, features, and aspects of the invention will be described in detail below with reference to the drawings.

FIG. 1 is a block diagram illustrating a configuration of an image processing apparatus 10 according to a first exemplary embodiment.

In FIG. 1, a reader unit (i.e., an image input apparatus) 200 can optically read an image of a document (i.e., an original) and can convert the read image into image data. The reader unit 200 includes a scanner unit configured to read the document and a document feeding unit configured to convey the document.

A printer unit (i.e., an image output apparatus) 300 includes a paper feeding unit 360 configured to set a plurality of types of recording papers and a marking unit 310 configured to transfer and fix the image data on a recording paper. The printer unit 300 further includes a paper discharging unit 370 configured to sort and staple printed recording papers and discharge the stapled papers to the outside of the apparatus. In the printer unit 300, the paper feeding unit 360 supplies recording papers to the marking unit 310. The marking unit 310 prints the image data on a recording paper that may be conveyed from the paper feeding unit 360. The paper discharging unit 370 discharges the printed paper to the outside of the apparatus.

A control apparatus 100 is electrically connected to the reader unit 200 and the printer unit 300, and is also connected to a host computer via a network (not illustrated). These connections may be a wired connection or a wireless connection.

The control apparatus 100 can provide a copy function. The copy function by the control apparatus 100 includes controlling the reader unit 200 to read an image of the document and generate image data and further includes controlling the printer unit 300 to output the generated image data to a recording paper.

The control apparatus 100 can further provide a network scanner function. The network scanner function by the control apparatus 100 includes converting the image data read from the reader unit 200 into coded data and transmitting the coded date to an external apparatus (e.g., a host computer) via a network (not illustrated). Moreover, the control apparatus 100 can provide a printer function. The printer function by the control apparatus 100 includes converting image data read from a storage medium which can be attached to and detached from the image processing apparatus 10 or the coded data received from the external apparatus via the network into image data and outputting the converted image data to the printer unit 300.

A power source unit 400 is a power source circuit that can receive electric power from an alternating-current commercial power source (i.e., an AC power source) and supply operation voltage (i.e., a DC voltage) 402 to the control apparatus 100, the reader unit 200, and the printer unit 300. The power source unit 400 can change a voltage value of the direct-current (DC) voltage according to a signal 401 supplied from the control apparatus 100.

In the present exemplary embodiment, the image processing apparatus 10 has the above-described plurality of functions. However, the image processing apparatus 10 may not have all of the above-described functions and can be an apparatus having only a printer function.

Figure 2:
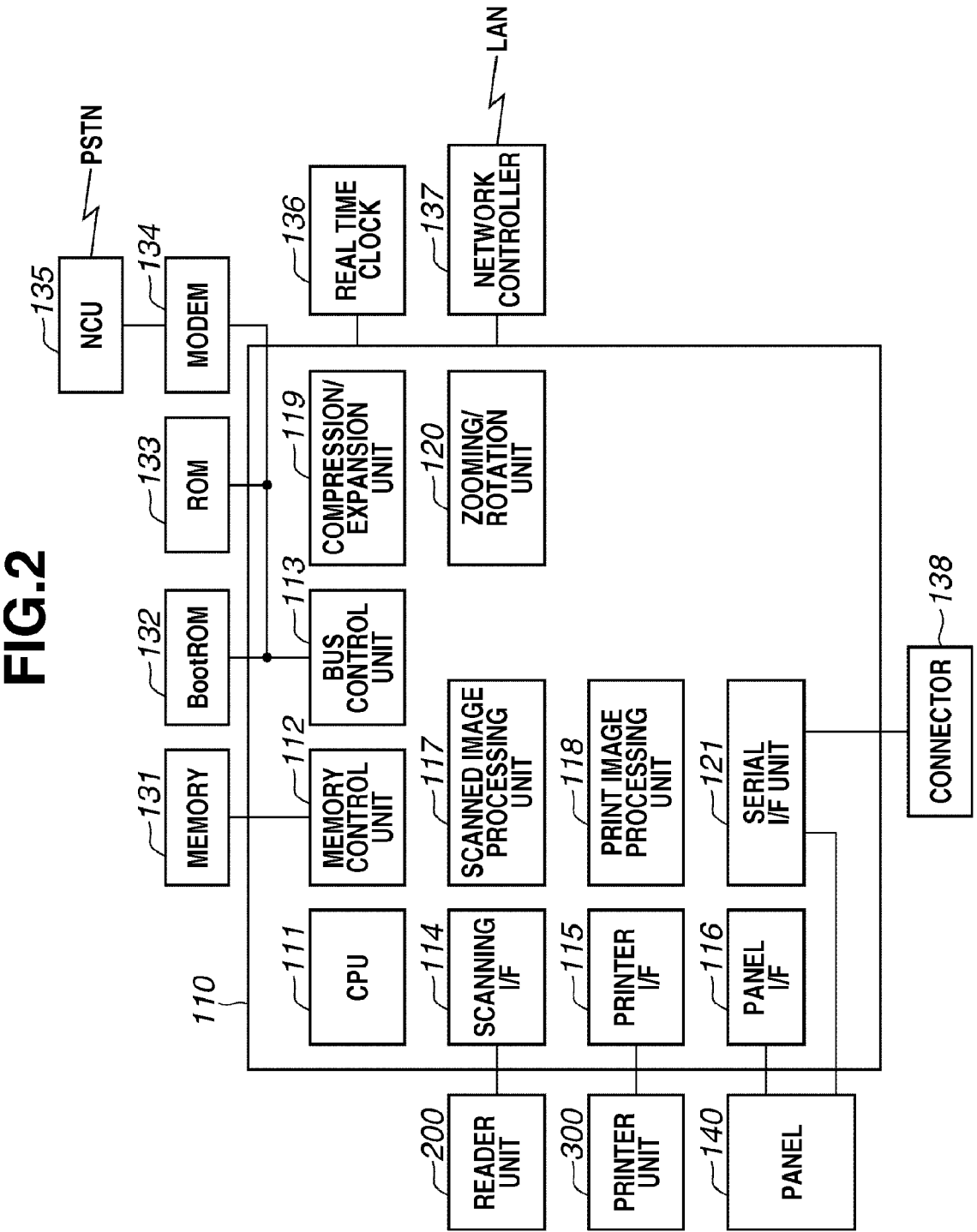
FIG. 2 is a block diagram illustrating a configuration of a control apparatus illustrated in FIG. 1.

FIG. 2 is a block diagram illustrating a configuration of the control apparatus 100 illustrated in FIG. 1. Constituent components similar to those illustrated in FIG. 1 are denoted by the same reference numerals.

A main controller 110 includes a central processing unit (CPU) 111, a memory control unit 112, a bus control unit 113, a scanning interface (I/F) 114, a printer I/F 115, a panel I/F 116, and a scanned image processing unit 117. The main controller 110 further includes a print image processing unit 118, a compression/expansion unit 119, and a zooming/rotation unit 120, and a serial I/F unit 121.

The CPU 111 and the memory control unit 112 control an overall operation that may be performed by the control apparatus 100. The CPU 111 can perform various operations according to a program stored in a memory 131. For example, operations described in the program include interpreting page description language (PDL) data that may be received from the host computer and rasterizing the PDL data into raster image data. The CPU 111 can interpret coded data and rasterize the image data by executing the program.

The memory control unit 112 can control transfer of various data that may be input to or output from each interface. The memory control unit 112 can perform arbitration of the bus and control transfer of direct memory access (DMA) data.

The bus control unit 113 can control accesses to a boot read only memory (ROM) 132, a ROM 133, and a modem 134 by the CPU 111.

The scanning I/F 114 can receive the image data that may be input from a scanner and can transfer the image data to the memory 131 or the scanned image processing unit 117.

The scanned image processing unit 117 can perform predetermined image processing on the image data received from the scanning I/F 114.

The scanned image processing unit 117 can perform various image processing (e.g., line pitch correction, offset correction, non-linear correction, color space matching, a modulation transfer function (MTF) correction, a space filter, and achromatic color determination).

The printer I/F 115 can generate a control signal based on a video control signal received from the printer unit 300 and can output, to the printer unit 300, the image data read from the memory 131 according to the control signal.

The print image processing unit 118 can acquire raster image data from the memory 131 and can output, to the memory 131, data which is subjected to image processing (e.g., color space compression, background removal, log conversion, non-linear color space conversion, random number addition, gamma conversion, and halftone processing). The halftone processing may include, as example types of processing, error diffusion processing and screen processing. In the present exemplary embodiment, the print image processing unit 118 is configured to selectively execute the error diffusion processing and the screen processing as the different type of halftone processing.

The screen processing is applicable to a case where a weighting matrix is used to binarize multi-valued image data. In this case, the screen processing arranges thresholds included in the matrix so as to form a screen of a predetermined angle by the binarized image data and performs the binarization processing according to the arranged thresholds. The error diffusion processing is applicable in a case where the multi-valued image data is binarized using the thresholds included in the weighting matrix. The error diffusion processing successively distributes an error between a density value of the image data and the threshold to a neighboring pixel and performs the binarization processing so as to store an entire density of the image data.

The compression/expansion unit 119 can compress the raster image data stored in the memory 131 according to any one of a Modified Huffman (MH)/Modified Read (MR)/Modified Modified Read (MMR)/Joint Bi-level Image Experts Group (JBIG)/Joint Photographic Experts Group (JPEG) methods. The compression/expansion unit 119 can expand the stored compressed coded data into raster image data. The compressed/expanded image data can be stored in the memory 131.

The zooming/rotation unit 120 can perform processing for enlarging/reducing the raster image data stored in the memory 131 and rotating the image by an angle selected from 90°, 180°, and 270°. The raster image data which is subjected to the enlargement/reduction processing and the rotation processing can be stored in the memory 131. The bootROM 132 can store a boot program of the CPU 111.

The ROM 133 can store various programs that may be executed by the CPU 111 and various setting information (including a user mode). The ROM 133 can also store font data. The CPU 111 can communicate with the panel 140 via the panel I/F 116. The panel 140 includes a liquid crystal display device and a plurality of hard keys. The panel 140 transmits a signal which is input by a user using the hard key to the CPU 111 via the panel I/F 116. The liquid crystal display device of the panel 140 can display the data received from the CPU 111 via the panel I/F 116. For example, the liquid crystal display device can display an operation state of the image processing apparatus 10 and operation keys that enable the user to operate the image processing apparatus 10.

The serial I/F unit 121 can function as an interface that receives PDL data from the host computer or an interface that communicates with the panel 140. For example, the serial I/F unit 121 communicates with the host computer, a storage medium attachable to the image processing apparatus 10, and other various devices via a connector 138.

The modem 134 and an NCU 135 which are connected to a public switched telephone network (PSTN) can perform FAX communication control.

A real time clock module 136 can update and store date/time information that may be managed by the image processing apparatus 10. A backup battery can supply operation power to the real time clock module 136.

A network controller 137 is connected to a local area network (LAN). As a general network, for example, Ethernet® can be used to receive PDL data from the host computer and transmit image data to the host computer.

Figure 3:
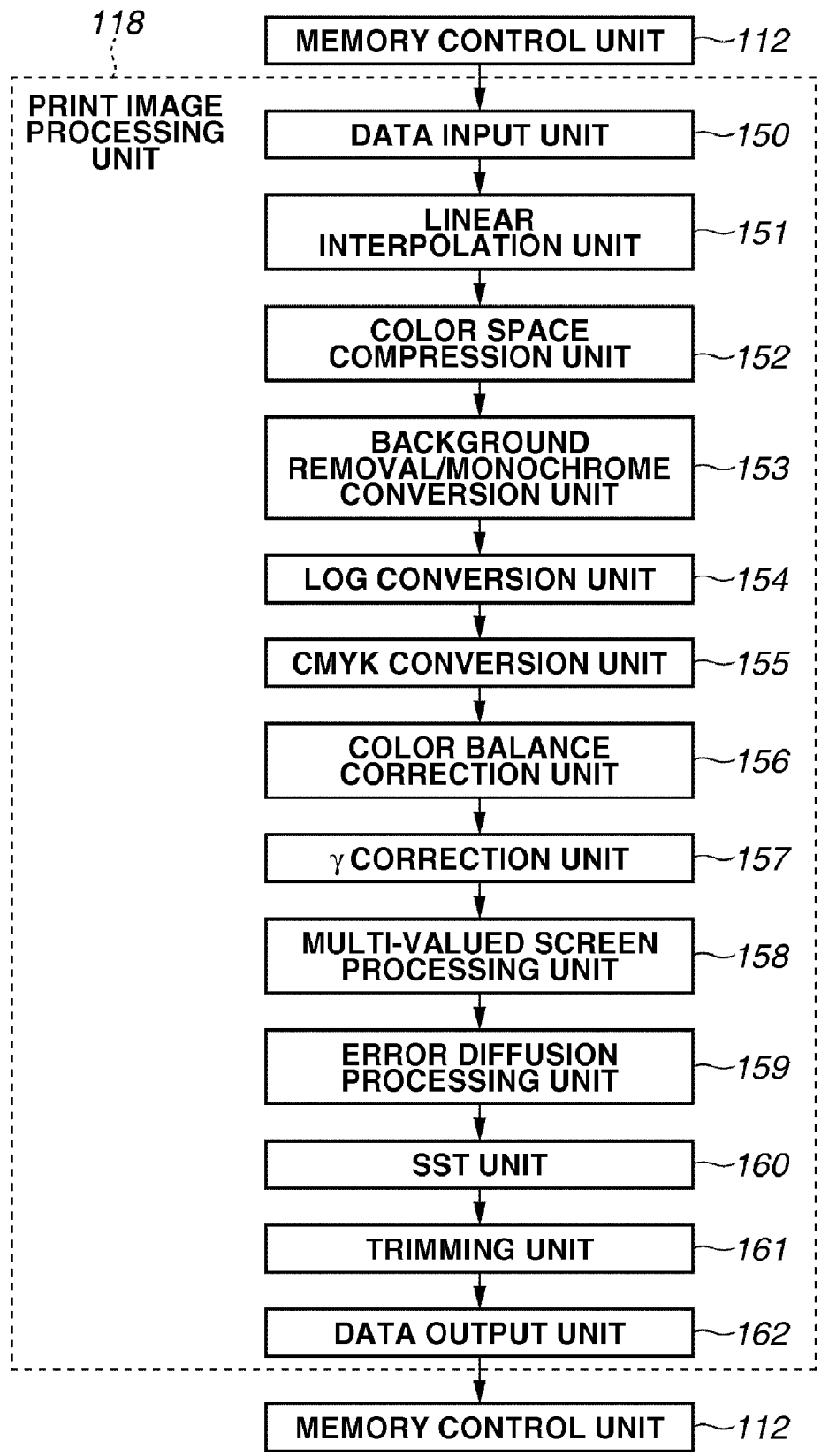
FIG. 3 is a block diagram illustrating a configuration of a print image processing unit illustrated in FIG. 2.

FIG. 3 is a block diagram illustrating a configuration of the print image processing unit 118 illustrated in FIG. 2.

In FIG. 3, a data input unit 150 can receive image data from the memory 131 via the memory control unit 112. The data input unit 150 can perform format conversion on the data received from the memory control unit 112 and transfer the converted image data to a linear interpolation unit 151. The linear interpolation unit 151 can perform enlargement/reduction processing on the image. A color space compression unit 152 can compress a color space of the input image data into a color reproduction area of the printer unit 300, and perform various adjustments (e.g., color saturation adjustment, color phase adjustment, background adjustment, and black area adjustment). If an input color space is YUV, the color space compression unit 152 converts the color space into an RGB color space.

A background removal/monochrome conversion unit 153 can perform non-linear calculations on RGB image data to remove a background of the image. The background removal/monochrome conversion unit 153 can further convert the RGB image data into monochrome image data if the scanned image processing unit 117 determines that the image data to be processed is an achromatic color.

A LOG conversion unit 154 can perform non-linear conversion using a one-dimensional look-up table to convert the image data from an RGB signal to a CMY signal.

A CMYK conversion unit 155 can convert the CMY signal into a CMYK signal using a three-dimensional look-up table. If the color space of the image data input from the memory control unit 112 is CMYK, the input data is directly transmitted from the color space compression unit 152 to the CMYK conversion unit 155. A color balance correction unit 156 can adjust lightness of the image.

A γ correction unit 157 can independently perform density adjustment processing on each input CMYK signal using the one-dimensional look-up table. A multi-valued screen processing unit 158 can perform screen processing on the input multi-valued image data to convert the image data into 4/2/1 bit gradations. An error diffusion processing unit 159 can perform error diffusion processing on the input multi-valued image data to convert the image data into 4/2/1 bit gradations.

When the screen processing is applied to the input image, the multi-valued screen processing unit 158 performs the screen processing and the error diffusion processing unit 159 directly outputs the input image data. When the error diffusion processing is applied to the input image, the multi-valued screen processing unit 158 directly outputs the input image data and the error diffusion processing unit 159 performs the error diffusion processing. The image processing apparatus 10 can selectively perform the above-described screen processing and the error diffusion processing, when it is required.

In the present exemplary embodiment, as described below, the CPU 111 determines an aspect ratio of the input image data and determines the halftone processing to be performed on the image data according to the determined aspect ratio. More specifically, the CPU 111 causes the error diffusion processing unit 159 to perform the error diffusion processing or causes the multi-valued screen processing unit 158 to perform the screen processing on the input image data according to the determined aspect ratio as described in more detail in the following description.

An SST unit 160 can perform pattern matching to detect an edge portion of image data and can perform conversion to reduce a jaggy to obtain a smooth image. A trimming unit 161 can perform frame removal and masking processing on the image data.

A data output unit 162 can output the processed image data to the memory control unit 112. The memory control unit 112 stores the received image data in the memory 131. Then, the CPU 111 transfers the image data stored in the memory 131 to the printer unit 300. The printer unit 300 performs printing based on the transferred image data.

Figure 4:
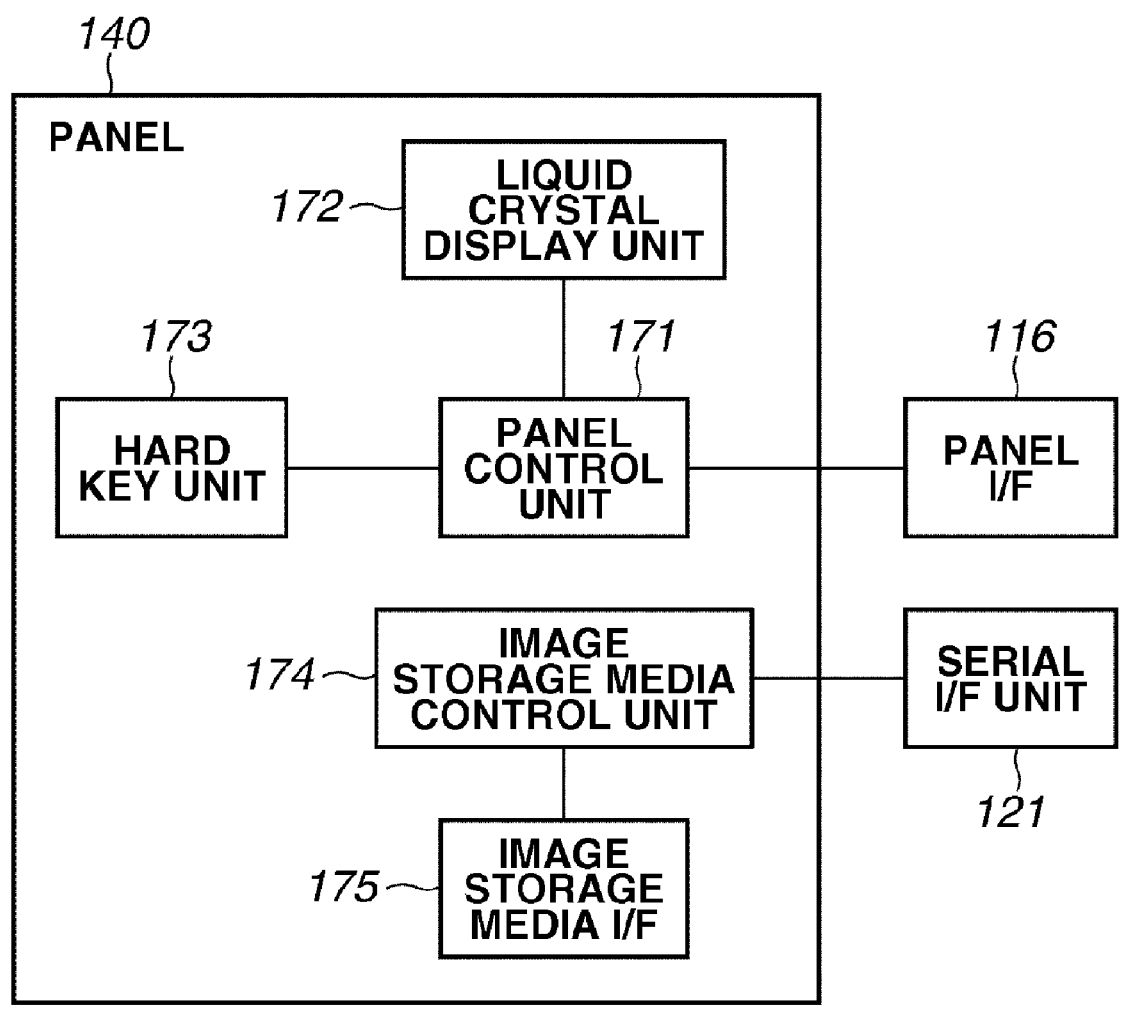
FIG. 4 is a block diagram illustrating a configuration of a panel illustrated in FIG. 2.

FIG. 4 is a block diagram illustrating a configuration of the panel 140 illustrated in FIG. 2. Constituent components similar to those illustrated in FIG. 2 are denoted by the same reference numerals.

In FIG. 4, the panel I/F 116 is connected to a panel control unit 171 of the panel 140. The panel control unit 171 can monitor an input from a hard key unit 173 and control a liquid crystal display unit 172. If a key input is entered via the hard key unit 173, the panel control unit 171 notifies the CPU 111 of the entry of the key input via the panel I/F 116. The CPU 111 causes the liquid crystal display unit 172 to change its display based on an input from the panel I/F 116. The liquid crystal display unit 172 may include a touch panel so that the CPU 111 can receive an input entered by a user via the touch panel.

The serial I/F unit 121 illustrated in FIG. 4 is connected to an image storage media control unit 174 of the panel 140. The image storage media control unit 174 can communicate with an image storage medium attached to the image processing apparatus 10 via an image storage media I/F 175 that includes an image storage media mounting portion.

The image storage media which are attachable to and detachable from the image processing apparatus 10 include an SD Card (i.e., a trademark), a Compact Flash®, and a USB flash memory. However, the image storage media are not limited to the above mentioned ones and may include other storage media, such as a compact disc-ROM (CD-ROM), a CD-recordable (CD-R), a CD-rewritable (CD-RW), and a digital versatile disc (DVD (DVD-ROM, DVD-R)). For example, the image storage media can be configured to store image data that may be captured by a digital camera, image data that may be read by a scanner, and image data that may be created by an application of a computer.

The image storage media I/F 175 can be configured to include a plurality of mounting portions to which a plurality of image storage media can be simultaneously attached. In the present exemplary embodiment, the panel 140 includes the image storage media I/F 175. However, the image storage media I/F 175 can be provided in a device other than the panel 140. For example, the main controller 110 may include an image storage media I/F so that an image storage medium can be attached to and detached from the image storage media I/F.

Figure 5:
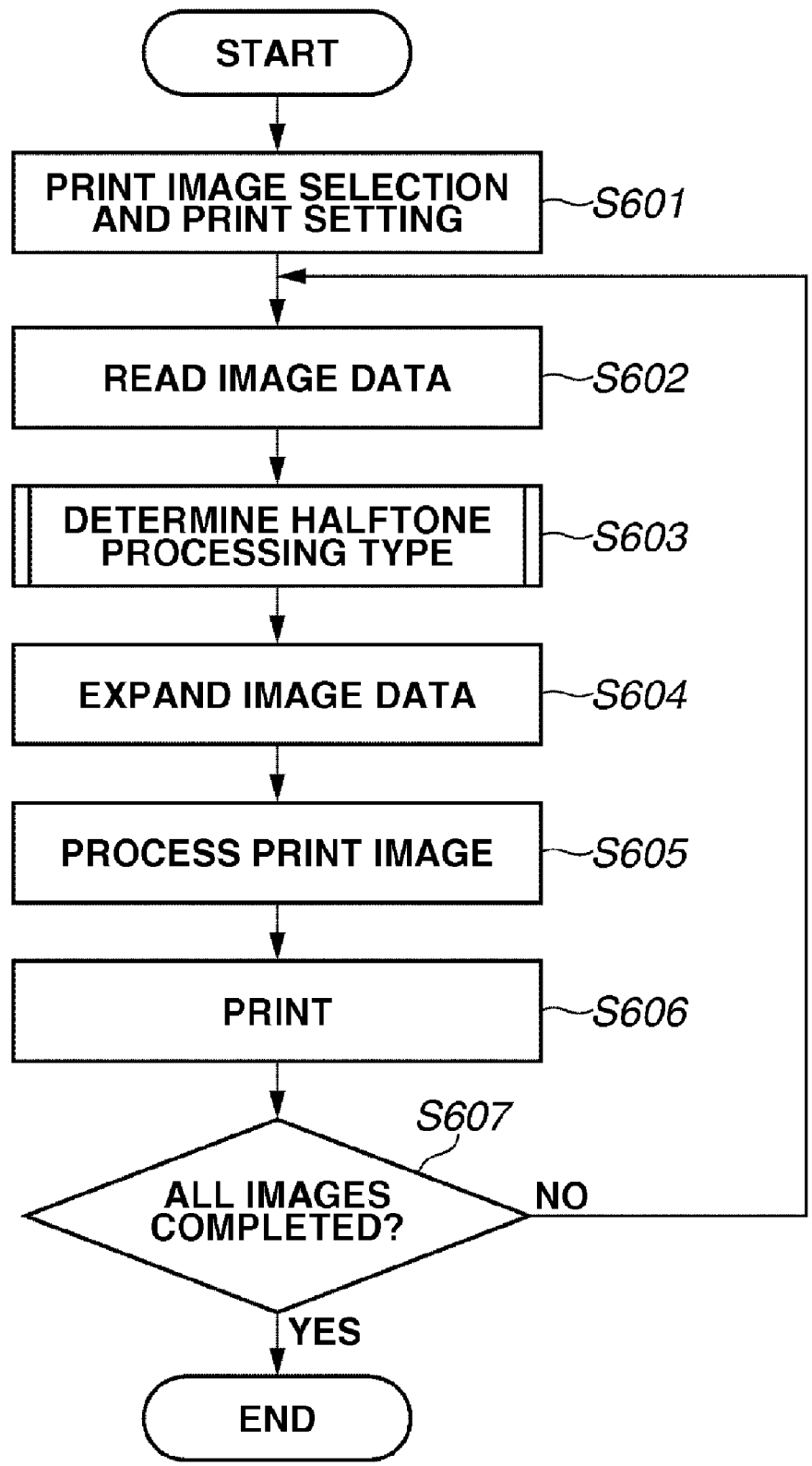
FIG. 5 is a flowchart illustrating an example procedure of data processing that can be performed by the image processing apparatus according to the exemplary embodiment.

FIG. 5 is a flowchart illustrating an example procedure of data processing that can be performed by the image processing apparatus 10 according to the present exemplary embodiment. The data processing illustrated in FIG. 5 is example processing for printing image data stored in an image storage medium. To realize the processing of steps S601 to S607, the CPU 111 executes a control program loaded from the ROM 133 to the memory 131.

When a user performs printing of image data stored in the image storage medium, the user selects an image to be printed and performs print settings via the panel 140.

In step S601, the CPU 111 receives a selection result of the image and the print settings entered by the user via the panel 140. The print settings include, for example, a number of copies, a sheet size, printing layout, and halftone processing. The user can set one of "automatic processing", "screen processing", and "error diffusion processing", as a setting of the halftone processing.

An image storage medium may store print settings together with image data. In this case, the user can change the print settings via the panel 140 before starting a printing operation. A file format of image data stored in the image storage medium is compatible with the JPEG, a tag image file format (TIFF) and other various file formats and is not limited to a specific file format.

In step S601, if the CPU 111 receives a print start instruction from the user via the panel 140 after receiving the selection of the image and the print settings, the processing proceeds to step S602.

In step S602, the CPU 111 reads the image data and header information thereof from the image storage medium connected to the image storage media I/F 175 via the serial I/F unit 121. The header information includes a data size of the image data and length information of main scanning/sub scanning directions. Then, the CPU 111 stores the image data and the header information read from the image storage medium in the memory 131.

In step S603, the CPU 111 determines a type of halftone processing that may be performed on the image data if the "automatic processing" is selected as the halftone processing setting in step S601.

Processing for determining a halftone processing method is described in more detail with reference to the flowchart of FIG. 7. Then, the CPU 111 associates the image data with information indicating the determined halftone type and stores the associated image data and the information in the memory 131. If the "screen processing" or the "error diffusion processing" is selected in step S601 as the halftone processing to be performed instead of the "automatic processing", then in step S603, the CPU 111 determines to perform the selected halftone processing. If the image data to be subjected to the halftone processing is monochrome image data that does not require execution of the halftone processing, the CPU 111 determines to perform neither the screen processing nor the error diffusion processing.

In step S604, the CPU 111 executes expansion processing if the image data stored in the memory 131 is compressed data. The CPU 111 stores the expanded data in the memory 131. In step S605, the CPU 111 executes the halftone processing according to the print settings set in step S601 and the type determined in step S603. More specifically, the CPU 111 performs the halftone processing on the image data according to the information indicating the type of the halftone processing which is determined in step S603 and stored in the memory 131.

For example, the multi-valued screen processing unit 158 or the error diffusion processing unit 159 of the print image processing unit 118 illustrated in FIG. 3 can perform the halftone processing on the image data to generate a halftone image and store the generated halftone image to the memory 131. Then, in step S606, the halftone image stored in the memory 131 is printed via the printer I/F 115 in synchronization with a control signal supplied from the printer unit 300. If the image data is monochrome image data, the CPU 111 executes printing without performing the halftone processing on the image data in step S605.

In step S607, the CPU 111 determines whether printing of all pieces of the image data selected in step S601 is completed. If the CPU 111 determines that the printing of all pieces of the image data is not completed (NO in step S607), the processing returns to step S602. If the CPU 111 determines that the printing of all pieces of the image data is completed (YES in step S607), the CPU 111 terminates the processing of the routine illustrated in FIG. 5.

An example of a method for determining the type of the halftone processing in step S603 is described with reference to FIG. 6.

Figure 6:
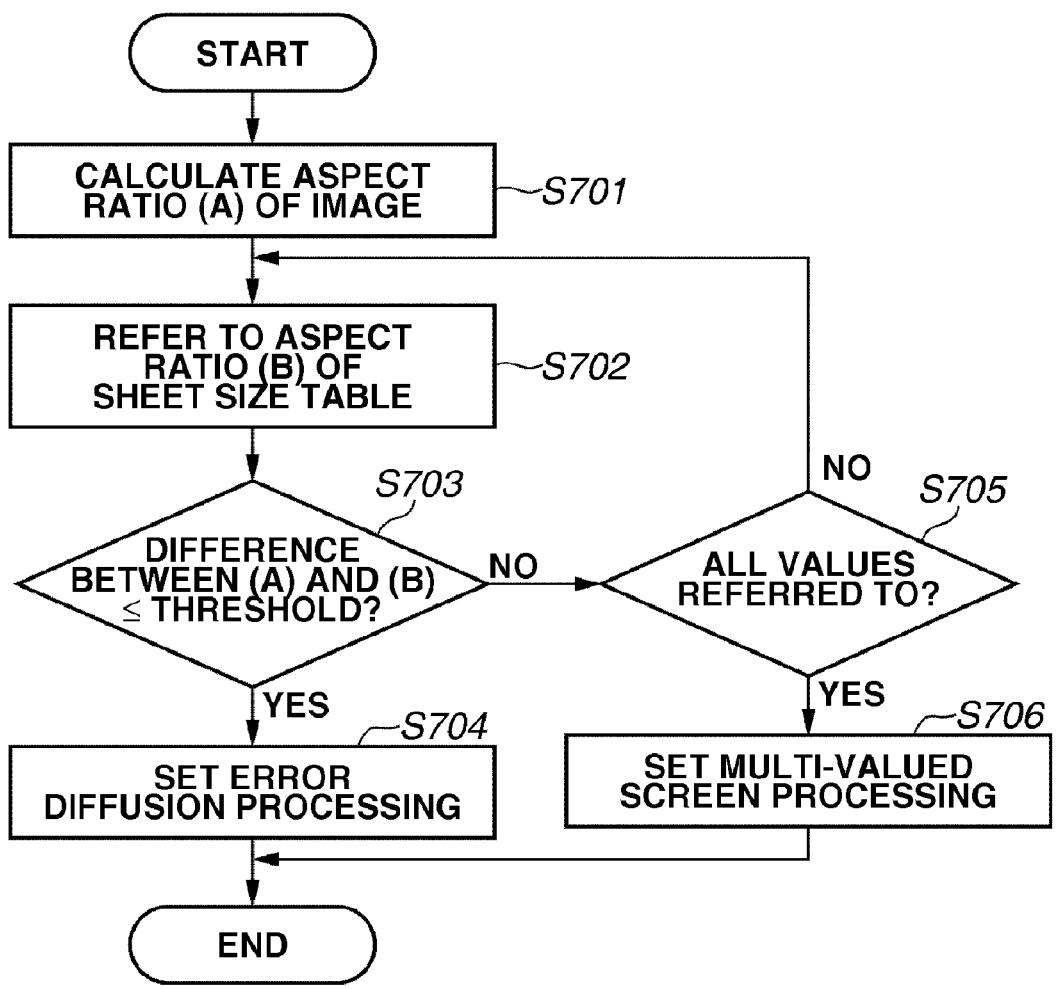
FIG. 6 is a flowchart illustrating an example procedure of data processing that can be performed by the image processing apparatus according to the exemplary embodiment.

FIG. 6 is a flowchart illustrating an example procedure of data processing that can be performed by the image processing apparatus 10 according to the present exemplary embodiment. To realize the processing of steps S701 to S707, the CPU 111 executes a control program loaded from the ROM 133 to the memory 131.

The halftone processing performed on image data according to the present exemplary embodiment is described below. For example, the screen processing can be desirably applied to image data captured by a digital camera to obtain a stable image.

However, the error diffusion processing can be desirably applied to image data of a document (i.e., an original) read by a scanner.

It is because a halftone dot image may be included in the image data of the document read by the scanner. If the screen processing is applied to the image data including the halftone dot image, a processed image may include a moire.

In the present exemplary embodiment, the CPU 111 can determine whether the image data to be subjected to the halftone processing is image data which was read by the scanner according to a method described below. If it is determined that the image data was read by the scanner, the CPU 111 performs control for the error diffusion processing (namely, the CPU 111 does not perform the screen processing) to prevent generation of moire on the image data which is subjected to the halftone processing.

The document read by the scanner may be a sheet having a regular size (e.g., A4 size or A3 size) whose size is regulated beforehand. Hence, in the present exemplary embodiment, the CPU 111 determines whether the image data stored in the image storage medium is an image read by the scanner based on a difference between an aspect ratio of the image data and an aspect ratio of a regular-size sheet.

FIG. 7 illustrates various sheet sizes and their aspect ratios. As illustrated in FIG. 7, if the sheet size is A3 or A4, the aspect ratio of the sheet is 1.41. If the sheet size is A5, the aspect ratio of the sheet is 1.42.

If the image data has an aspect ratio similar to one of these aspect ratios, there is a high possibility that the image data corresponding to a regular-size document is read by the scanner. Hence, a sheet size table illustrated in FIG. 8 that includes some values selected from the aspect ratios illustrated in FIG. 7, can be stored in the ROM 133 or a nonvolatile RAM (NVRAM, not illustrated).

Then, if the aspect ratio of input image data is equal or similar to one of the aspect ratios of the regular-size sheets illustrated in FIG. 8, the CPU 111 determines to perform the error diffusion processing on the input image data. Namely, the CPU 111 does not perform the screen processing.

An example of a method for processing image data according to the present exemplary embodiment is described below in more detail with reference to FIG. 6.

In step S701, the CPU 111 calculates an aspect ratio (A) of an image based on the length information of the main scanning/sub scanning directions included in the header information of the image data stored in the memory 131.

In the calculation, the CPU 111 obtains the aspect ratio (A) by dividing the long side size by the short side size (as the image size in the main scanning and the sub scanning direction) so that the aspect ratio (A) becomes equal to or greater than 1.

In step S702, the CPU 111 refers to an aspect ratio (B) of a sheet described in the sheet size table illustrated in FIG. 8. The aspect ratio (B) values illustrated in FIG. 8 represent the aspect ratios of various regular sheets. In step S702, the CPU 111 successively refers to the values, from the number 1, listed in the sheet size table illustrated in FIG. 8.

In step S703, the CPU 111 compares the aspect ratio (A) of the image with the aspect ratio (B) of the sheet. If the CPU 111 determines a difference between the compared aspect ratios is equal to or less than a predetermined value (i.e., a threshold) (YES in step S703), the processing proceeds to step S704. More specifically, if the aspect ratio (A) of the image is within a predetermined range from the aspect ratio (B) of the sheet, the CPU 111 determines that the image data has been read by the scanner and the processing proceeds to step S704. In step S704, the CPU 111 sets to perform the error diffusion processing on the image data. The CPU 111 associates the image data with information indicating setting of the error diffusion processing and stores the associated image data and the information in the memory 131.

If in step S703 the CPU 111 determines that the difference is larger than the predetermined value (NO in step S703), the processing proceeds to step S705. For example, it is desired to set the predetermined value to 0.01. A user may change the predetermined value.

In step S705, the CPU 111 determines whether all values in the sheet size table illustrated in FIG. 8 has been referred to. If the CPU 111 determines that there is any value to be referred to (NO in step S705), the processing returns to step S702 to refer to the next value.

If the CPU 111 determines that all values have been referred to (YES in step S705), the processing proceeds to step S706. In step S706, the CPU 111 sets to execute the screen processing on the image data. The CPU 111 associates the image data with information indicating setting of the screen processing and stores the associated image data and the information in the memory 131.

As described above, in step S603, the CPU 111 determines the type of the halftone processing based on the aspect ratio of the image. Then, in step S605 illustrated in FIG. 5, the CPU 111 executes the halftone processing on the image data according to the determined type.

Through the above-described control, the image processing apparatus 10 performs the error diffusion processing (not the screen processing) when it is presumed that the image data to be subjected to the halftone processing is image data read by the scanner. Therefore, the image processing apparatus 10 can prevent generation of moire.

Through the above-described control, the image processing apparatus 10 can determine whether the image data read from a storage medium is image data read by the scanner without performing image processing on the image data. Therefore, the image processing apparatus 10 does not require any circuit dedicated to the above-described image processing. A user is not required to set whether the image data to be printed is read by the scanner. As described above, an image processing apparatus according to the present exemplary embodiment can appropriately execute the halftone processing on image data read from a storage medium without increasing the cost of the apparatus while reducing the burden placed on the user.

In the present exemplary embodiment, in step S703, the CPU 111 compares the aspect ratio (B) of the sheet with the aspect ratio (A) of the image. However, according to another exemplary embodiment, the memory 131 may store a vertical length and a lateral length of each regular-size sheet. In step S703, the CPU 111 may compare the vertical length and the lateral length of a regular-size sheet with a vertical length and a lateral length of an image corresponding to image data included in header information of the image data stored in the memory 131.

For example, the length of image data in the sub scanning direction can be regarded as a vertical length of the image data. The length of the image data in the main scanning direction can be regarded as a lateral length of the image data. In this case, the CPU 111 respectively compares the lengths of the image data in the main scanning direction and the sub scanning direction that is included in the header information of the image data stored in the memory 131 with the vertical length and the lateral length of a regular-size sheet. Then, the CPU 111 determines whether the compared lengths are within a predetermined range.

If the CPU 111 determines that both the vertical length and the lateral length of the image data stored in the memory 131 are within the predetermined range, then in step S704, the CPU 111 executes the halftone processing, such as the error diffusion processing capable of preventing generation of moire, on the image data. If the CPU 111 determines that the condition of step S703 is not satisfied as a result of the comparison with the vertical and lateral lengths of all regular-size sheets stored in the memory 131, the processing proceeds to step S706. In this case, the CPU 111 may execute the screen processing on the image data. Correspondence between the vertical length and the lateral length of the image corresponding to the image data and the lengths of the image data in the main scanning direction and the sub scanning direction may be opposite.

According to the method described in the first exemplary embodiment, the CPU 111 estimates whether the image data stored in the image storage medium is an image read by a scanner based on a difference between the aspect ratio of the image data and the aspect ratio of a regular-size sheet.

A second exemplary embodiment uses another method, which is different from the method described in the first exemplary embodiment, for estimating whether the image data is read by the scanner and determining whether to perform the screen processing on the image data based on an estimation result.

A hardware configuration of the second exemplary embodiment is similar to that of the first exemplary embodiment, so that the description is not repeated.

In the second exemplary embodiment, similar to the first exemplary embodiment, the CPU 111 executes the processing of the flowchart illustrated in FIG. 5 to execute halftone processing on image data that may be read from an image storage medium and perform printing of the processed image data. However, the second exemplary embodiment is different from the first exemplary embodiment in the processing performed by the CPU 111 in step S603. More specifically, in step S603, the CPU 111 executes processing illustrated in FIG. 9 which is different from the processing illustrated in FIG. 6.

Figure 9:
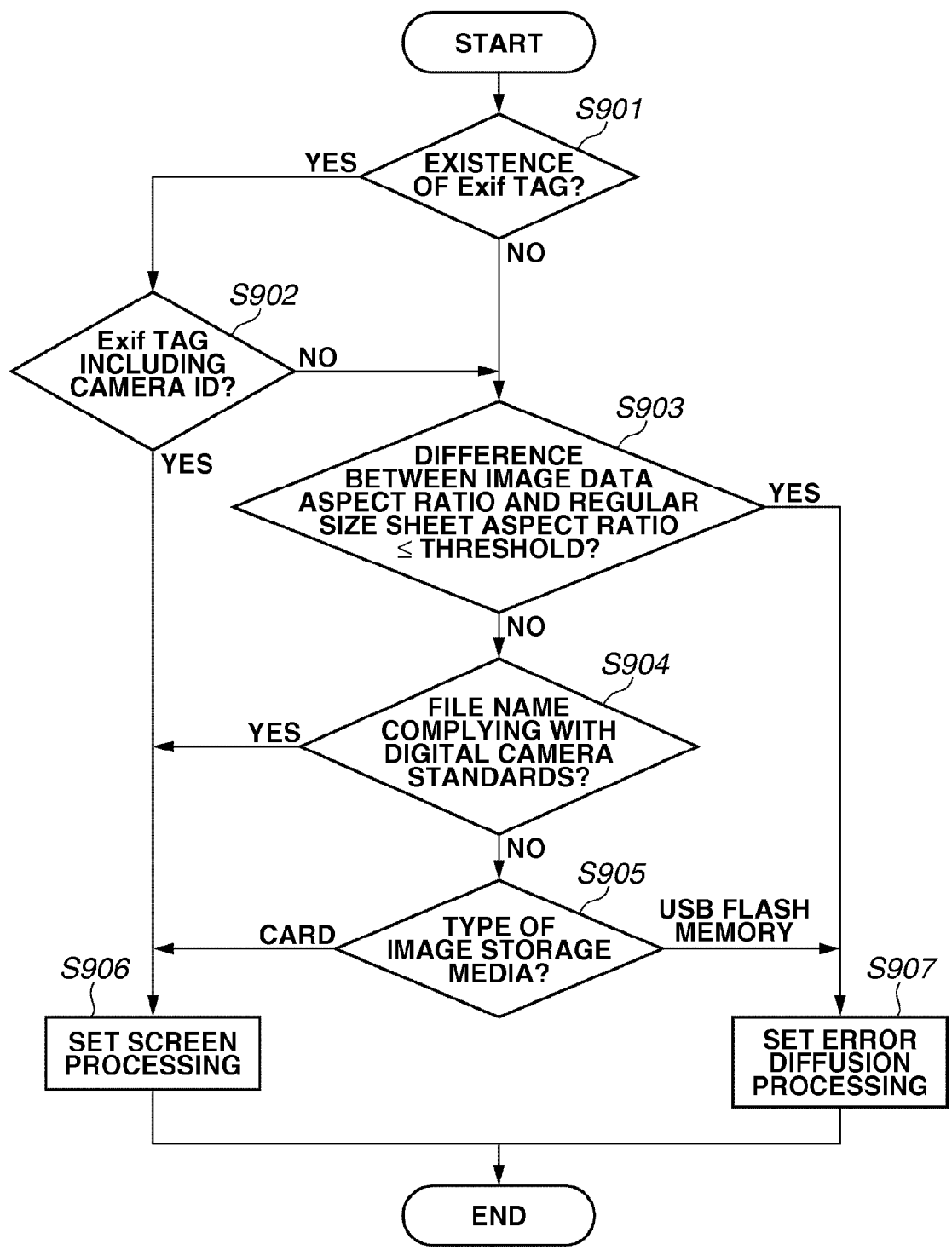
FIG. 9 is a flowchart illustrating an example procedure of data processing that can be performed by the image processing apparatus according to the exemplary embodiment.

FIG. 9 is a flowchart illustrating an example procedure of data processing that can be performed by the CPU 111 according to the second exemplary embodiment. To realize the processing of each step of the flowchart illustrated in FIG. 9, the CPU 111 reads and executes a program stored in the memory 131.

In step S901, the CPU 111 determines whether an Exif tag is present in image data to be subjected to the halftone processing which is read from an image storage medium and stored in the memory 131. If the CPU 111 determines that the Exif tag is present in the image data (YES in step S901), the processing proceeds to step S902. If the CPU 111 determines that the Exif tag is absent (NO in step S901), the processing proceeds to step S903.

In step S902, the CPU 111 analyzes the Exif tag and determines whether the image data corresponding to the Exif tag is image data captured by an imaging apparatus (e.g., a digital camera). For example, if the image data corresponding to the Exif tag is captured by the digital camera, the Exif tag includes information unique to the digital camera (e.g., a manufacturer name and a camera name). Therefore, in the processing of step S902, the CPU 111 determines whether the Exif tag includes the information about the digital camera.

If the CPU 111 determines that the Exif tag corresponding to the image data includes the information unique to the digital camera (e.g., a manufacturer name and a camera name) (YES in step S902), there is a high possibility that the image data corresponding to the Exif tag is captured by the digital camera. Therefore, in step S906, the CPU 111 sets the screen processing as processing to be performed on the image data. Then, the CPU 111 associates the image data with information indicating setting of the screen processing and stores the associated image data and the information in the memory 131. If the CPU 111 determines that the Exif tag corresponding to the image data does not include any information about the digital camera (NO in step S902), the processing proceeds to step S903.

In step S903, the CPU 111 compares an aspect ratio of an image corresponding to the image data to be subjected to the halftone processing with an aspect ratio of a regular-size sheet and determines whether a difference between the compared aspect ratios is within a predetermined range. The CPU 111 calculates the aspect ratio of the image based on the lengths in the main scanning/sub scanning directions that are included in the header information of the image data stored in the memory 131. In the calculation, the CPU 111 obtains the aspect ratio by dividing the long side size by the short side size (as the image size in the main scanning and the sub scanning direction) so that the aspect ratio becomes equal to or greater than 1.

The CPU 111 compares the aspect ratio of the image corresponding to the image data with the aspect ratio of the regular sheet size stored in the sheet size table of FIG. 8. If CPU 111 determines that the difference between the compared aspect ratios is equal to or less than a predetermined value (YES in step S903), the processing proceeds to step S907. In step S907, the CPU 111 sets the error diffusion processing as processing to be performed on the image data. This is because, when the CPU 111 determines that the difference between the aspect ratio of the image corresponding to the image data and the aspect ratio of the regular-size sheet stored in the sheet size table of FIG. 8 is equal to or less than the predetermined value, there is a high possibility that the image data is read by the scanner. Then, the CPU 111 associates the image data with information indicating setting of the error diffusion processing and stores the associated image data and the information in the memory 131.

If the CPU 111 determines that the difference between the aspect ratio of the image corresponding to the image data and the aspect ratio of the regular-size sheet stored in the sheet size table of FIG. 8 is greater than the predetermined value (NO in step S903), the processing proceeds to step S904. It is, for example, desired to set the above-described predetermined value to 0.01. A user may change the predetermined value.

In step S904, the CPU 111 analyzes a file name of the image data to be subjected to the halftone processing and determines whether the file name complies with the standards of the digital camera. For example, the CPU 111 determines whether the file name of the image data can satisfy the following rules.

Eight characters in total (not including extension)

The first to fourth characters constitute an arbitrary character string that includes only single-byte alphanumeric upper-case letters and does not include any 2-byte or other specific code.

The fifth to eighth characters are a numerical value selected from "0001" to "9999."

These rules are formatted according to the Design rule for Camera File System (DCF). When a digital camera stores image data, a control unit of the digital camera can automatically allocate a file name for the image data according to the above-described rules. Accordingly, if a file name of the image data satisfies all of these rules, there is a high possibility that the image data is captured by a digital camera. Therefore, if the CPU 111 determines that the analyzed file name satisfies these rules (YES in step S904), the processing proceeds to step S906. In step S906, the CPU 111 sets the predetermined screen processing as processing to be performed on the image data. In this case, the CPU 111 associates the image data with information indicating setting of the predetermined screen processing and stores the associated image data and the information in the memory 131. On the other hand, if the CPU 111 determines that the analyzed file name does not satisfy any one of these rules (NO in step S904), the processing proceeds to step S905.

In step S905, the CPU 111 identifies the type of the image storage medium that stores the image data to be subjected to the halftone processing. For example, a digital camera may use an SD Card® or a Compact Flash® to store captured image data. Accordingly, if the CPU 111 determines that the type of the image storage medium storing the image data is SD Card® or Compact Flash®, the processing proceeds to step S906. For example, if the CPU 111 determines that the mounting portion for the image storage medium from which the image data is read is dedicated to the SD Card® or the Compact Flash® (CARD in step S905), the processing proceeds to step S906. In step S906, the CPU 111 sets the predetermined screen processing as processing to be performed on the image data. Then, the CPU 111 associates the image data with information indicating setting of the predetermined screen processing and stores the associated image data and the information in the memory 131.

Further, if the CPU 111 determines that the mounting portion for the image storage medium that stores image data to be subjected to the halftone processing is dedicated to the USB flash memory (USB FLASH MEMORY in step S905), the processing proceeds to step S907. In step S907, the CPU 111 sets the error diffusion processing as processing to be performed on the image data. Then, the CPU 111 associates the image data with information indicating setting of the error diffusion processing and stores the associated image data and the information in the memory 131.

Subsequently, the CPU 111 performs the processing of step S604 and the subsequent steps illustrated in FIG. 5 to execute the halftone processing having been set in step S906 or step S907 on the image data and print the image data having been subjected to the halftone processing.

As described above, if there is a high possibility that the image data read from the image storage medium is read by the scanner, the CPU 111 performs control for executing the error diffusion processing. Namely, the CPU 111 does not perform the predetermined screen processing on the image data. Further, if there is a high possibility that the image data read from the image storage medium is captured by a digital camera, the CPU 111 performs control for the predetermined screen processing. Namely, the CPU 111 does not perform the error diffusion processing on the image data.

Therefore, the present exemplary embodiment can prevent generation of moire when the predetermined screen processing is executed on the image data read by a scanner. Further, if it is determined that the image data is captured by a digital camera, the present exemplary embodiment executes the screen processing on the image data. Therefore, the present exemplary embodiment can stabilize the quality of an image printed based on the image data captured by the digital camera.

Further, compared to a method for performing image processing on image data before performing the determination, the determination method according to the present exemplary embodiment can prevent increase of the cost of the apparatus. Moreover, the CPU 111 automatically sets the type of the halftone processing to be executed on the image data. Therefore, a user is not required to designate the type of the halftone processing to be executed. The burden placed on the user can be reduced.

The order of the processing according to the present exemplary embodiment is not limited to steps S903 to S905 of the flowchart illustrated in FIG. 9 and therefore can be arbitrarily changed. For example, the CPU 111 may execute only one or two of three determinations illustrated in steps S903 to S905, instead of executing all of the determination processing. It may be configured to allow the user to designate the determination processing to be executed.

In the above-described first or second exemplary embodiment, the CPU 111 estimates whether the image data read from an image storage medium may be read by the scanner to determine the type of the halftone processing to be executed. However, the CPU 111 may execute the screen processing on the image data even when the image data read from the image storage medium is read by the scanner. For example, when a scanner reads a document (i.e., an original) and an image storage medium stores image data of the read document, and the difference between an aspect ratio of the document read by the scanner and the aspect ratio of a regular-size sheet may be greater than a predetermined value.

The CPU 111 executes the processing illustrated in FIG. 6 according to the first exemplary embodiment to determine the aspect ratio of the image data read from the image storage medium. However, in this case, the difference between the aspect ratio of an image corresponding to the image data and the aspect ratio of the regular-size sheet is greater than the predetermined value. Therefore, the CPU 111 executes the predetermined screen processing on the image data read by the scanner. If the image data includes a halftone dot image, an image resultant from the predetermined screen processing may include moire.

Hence, in a third exemplary embodiment, the image processing apparatus 10 inquires a user about generation of moire on a printed image and enables the user to easily instruct reprint of the image if moire is generated.

The image processing apparatus 10 according to the present exemplary embodiment has a configuration similar to that described with reference to FIGS. 1 to 4, so that the description is not repeated.

First, the CPU 111 executes the processing of the flowchart illustrated in FIG. 5 to print the image data having been subjected to the halftone processing. As the processing to be executed in step S603 to determine the type of the halftone processing, the CPU 111 can execute the processing illustrated in FIG. 6 or FIG. 9.

Figure 10:
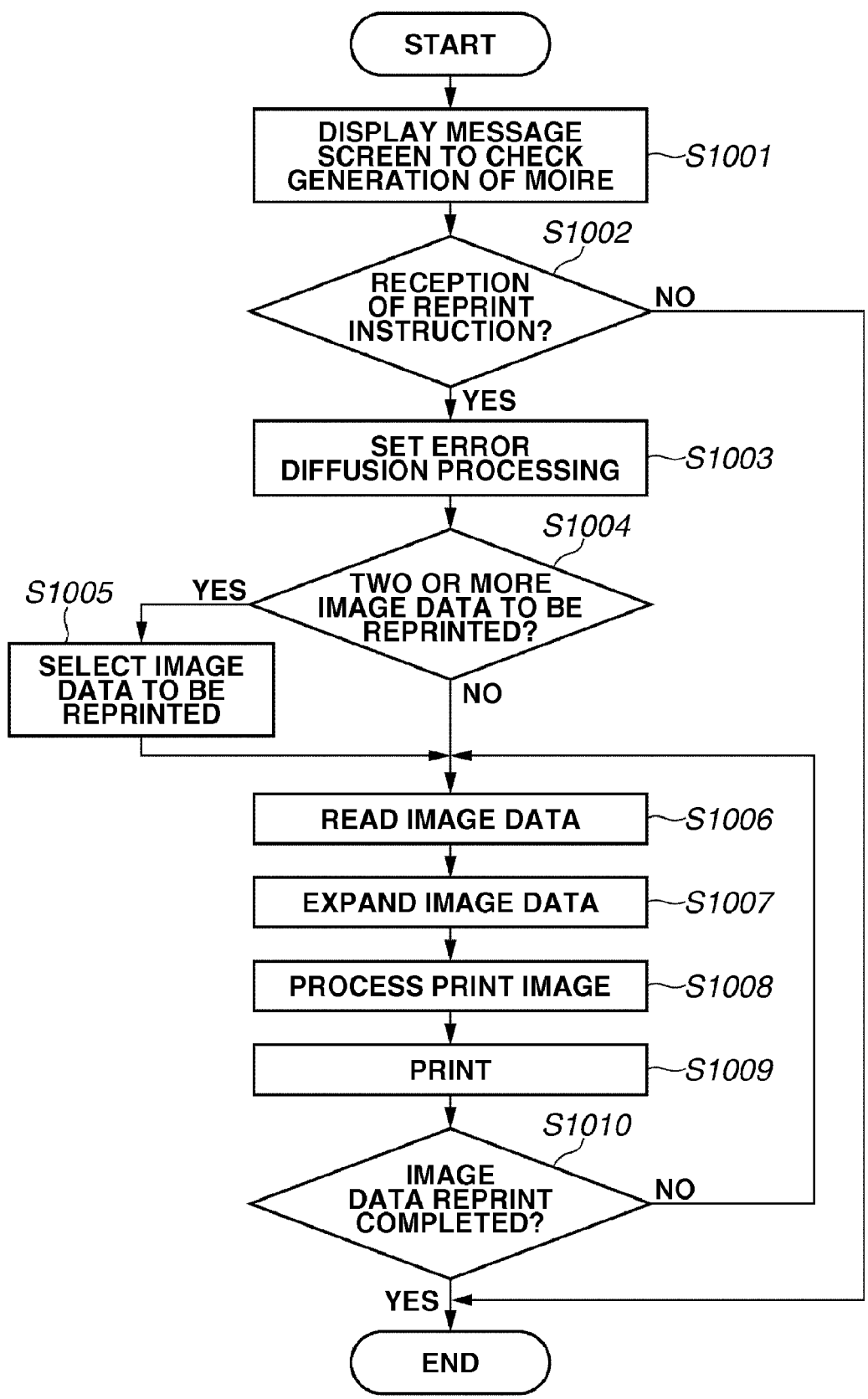
FIG. 10 is a flowchart illustrating an example procedure of data processing that can be performed by the image processing apparatus according to the exemplary embodiment.

In the present exemplary embodiment, the CPU 111 executes the processing of the flowchart illustrated in FIG. 5 and, after completed the processing for printing the image data, executes the processing of the flowchart illustrated in FIG. 10. The CPU 111 can execute a program stored in the memory 131 to realize the processing of the flowchart illustrated in FIG. 5.

In step S1001, the CPU 111 causes the panel control unit 171 to display a message on the liquid crystal display unit 172 of the panel 140 that inquires a user about generation of moire on a printed image. Further, the CPU 111 causes the panel control unit 171 to display a button that enables the user to instruct reprint of the image data, if any moire is generated on the printed image on the liquid crystal display unit 172. After the processing of step S1001 is completed, the processing proceeds to step S1002.

In step S1002, the CPU 111 determines whether a reprint instruction of the image data is received from the user, for example, by way of pressing the button displayed on the liquid crystal display unit 172. If the CPU 111 determines that the reprint instruction of image data is received (YES in step S1002), the processing proceeds to step S1003. On the other hand, if a predetermined duration has elapsed without receiving the reprint instruction, or if an instruction not to reprint the image data is received (NO in step S1002), the CPU 111 terminates the processing of the routine illustrated in FIG. 10.

In step S1003, the CPU 111 sets the error diffusion processing as processing to be performed on the image data and stores, in the memory 131, information indicating setting of the error diffusion processing.

In step S1004, the CPU 111 detects a number of pieces of image data which have been printed by the processing illustrated in FIG. 5. If the CPU 111 determines that the number of pieces of the detected image data is only one (NO in step S1004), the processing proceeds to step S1006. In this case, the number of pieces of the image data can be detected by counting a number of files that include the image data and the header information corresponding to the image data. If the CPU 111 determines that the number of pieces of the detected image data is two or more (YES in step S1004), the processing proceeds to step S1005. In step S1005, the CPU 111 causes the user to select image data to be reprinted. In step S1005, if any image data is selected by the user, the CPU 111 sets a flag indicating the selected image data. Then, the processing proceeds to step S1006.

In step S1006, the CPU 111 reads the image data to be reprinted and the header information of the image data from the image storage medium which is connected to the image storage media I/F 175 via the serial I/F unit 121. The header information includes a data size and length information of the main scanning/sub scanning directions of the image data. Then, the CPU 111 stores the image data and the header information read from the image storage medium in the memory 131.

In step S1007, the CPU 111 performs expansion processing on the image data if the image data is stored as compressed data in the memory 131 and stores the expanded data in the memory 131. In step S1008, the CPU 111 performs printing according to the print settings set in step S601. In step S1008, the CPU 111 further executes the error diffusion processing determined in step S1003 on the image data to perform printing. For example, the CPU 111 causes the error diffusion processing unit 159 to perform halftone processing on the image data and generates a halftone image that can be stored in the memory 131.

In step S1009, the CPU 111 performs printing of the halftone image stored in the memory 131 via the printer I/F 115 in synchronization with a control signal supplied from the printer unit 300.

In step S1010, the CPU 111 determines whether the reprint of all pieces of the image data that are instructed by the user to reprint is completed. If reprint of a plurality of pieces of the image data is instructed, the CPU 111 repeats the processing of steps S1006 to step S1009 until the reprint of the plurality of pieces of the image data is completed. If the CPU 111 determines that the reprint of all pieces of the image data that are instructed to reprint is completed (YES in step S1010), the CPU 111 terminates the processing of the routine illustrated in FIG. 10.

Through the above-described control, the image processing apparatus 10 inquires a user about generation of moire on a printed image. Therefore, the user can easily instruct reprint if moire is generated. Further, when reprint is performed, the CPU 111 automatically sets the error diffusion processing which can prevent generation of moire as processing to be performed on the image data to be reprinted. Therefore, the user is not required to designate execution of the error diffusion processing on the image data to be reprinted.

In the above-described exemplary embodiments, if it is determined to perform the screen processing or the error diffusion processing on image data stored in the image storage medium, the CPU 111 can perform the following control. The CPU 111 stores a determination result indicating whether to perform the screen processing or the error diffusion processing on the image data in association with the image data in the image storage medium.

Therefore, if the CPU 111 reads again the image data whose halftone type is designated by to the control illustrated in FIG. 6 or FIG. 9 stored in the image storage medium to perform printing, the CPU 111 can identify the type of the halftone processing according to the determination result stored in association with the image data. Therefore, when the type of the halftone processing to be executed is already determined by the control illustrated in FIG. 6 or FIG. 9, the CPU 111 is not required to execute the processing illustrated in FIG. 6 or FIG. 9 again.

Information indicating the halftone processing executed on the image data may be printed on a printing sheet of the image data, so that a user can identify the type of the halftone processing (i.e., the error diffusion processing or the screen processing) that was actually executed. Therefore, the user may understand why moire is generated if the printed information indicates the processing executed on the image data is the screen processing.

In the above-described exemplary embodiments, if there is a high possibility that the image data stored in the image storage medium is read by the scanner, the CPU 111 sets the error diffusion processing as processing to be performed on the image data. In this case, instead of performing the error diffusion processing, the CPU 111 may execute another halftone processing which can prevent generation of moire on image data In the above-described exemplary embodiments, the halftone processing (e.g., the screen processing or the error diffusion processing) is not limited for binarization of multi-valued image data. For example, the halftone processing may be executed for ternarization or quaternarization.

An example configuration of data processing program that can be read by an image processing apparatus according to the present invention is described below with reference to a memory map illustrated in FIG. 11.

FIG. 11 illustrates a memory map of a storage medium storing various data processing programs readable by an image processing apparatus according to the exemplary embodiment of the present invention.

Although not illustrated in the drawings, the storage medium can store management information for the programs stored in the storage medium, such as version information and creator name, as well as information relevant to an operating system (OS) that reads the programs, e.g., icons discriminately displaying the programs.

Further, a directory of the above-described storage medium can manage data belonging to various programs. Moreover, the storage medium can store a program for installing various programs on a computer and a decompression program if the installed program is compressed.

A host computer can execute a program installed from the outside to realize the functions indicated by the flowcharts according to the exemplary embodiments. In this case, the present invention is applicable when an information group including the program is supplied from an external storage medium to an output apparatus using an appropriate storage medium (e.g., CD-ROM, flash memory, and FD) or via a network.

A storage medium storing a software program code for realizing the functions of the above-described exemplary embodiments can be supplied to a system or an apparatus. A computer (or CPU or micro-processing unit (MPU)) in the system or the apparatus can read the program code from the storage medium and execute the program code to realize the functions of the above-described exemplary embodiments.

In this case, the program code itself read out from the storage medium can realize novel functions of the present invention. The storage medium storing the program code constitutes the present invention.

Accordingly, equivalents of programs (e.g., object code, interpreter program, and OS script data) are usable if they possess comparable functions of the programs.

A storage medium supplying the program can be selected from any one of a floppy disk, a hard disk, an optical disk, a magneto-optical (MO) disk, a CD-ROM, a CD-R, a CD-RW, a magnetic tape, a nonvolatile memory card, a ROM, and a DVD (DVD-ROM, DVD-R)).

In this case, the program code itself read out from the storage medium realizes the functions of the above-described exemplary embodiments. The storage medium storing the program code constitutes the present invention.

The method for supplying the program includes accessing a website on the Internet using a browser of a client computer, and downloading the computer program of the present invention or compressed files of the programs having automatic installing functions to a hard disk or other recording medium of the user. Furthermore, the program code constituting the program of the present invention can be divided into a plurality of files so that respective files are downloaded from different websites. Namely, the present invention encompasses World Wide Web (WWW) servers and File Transfer Protocol (FTP) servers that allow numerous users to download the program files so that their computers can realize the functions or processes according to the present invention.

Moreover, the program of the present invention can be distributed to users by encrypting the program according to the present invention and storing the encrypted program on a CD-ROM or comparable storage medium. Users who satisfy predetermined conditions are allowed to download key information from a website on the Internet. The users can decrypt the encrypted program with the obtained key information and can install the program on their computers. When the computer reads and executes the installed program, the computer can realize the functions of the above-described exemplary embodiments.

Moreover, an OS or other application software running on a computer can execute a part or all of actual processing based on instructions of the programs to realize the functions of the above-described exemplary embodiments.

Additionally, the program code read out from a storage medium can be written into a memory of a function expansion board inserted in a computer or into a memory of a function expansion unit connected to the computer. In this case, based on instructions of the program, a CPU provided on the function expansion board or the function expansion unit can execute a part or all of the processing to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-151452 filed Jun. 10, 2008 and Japanese Patent Application No. 2008-162309 filed Jun. 20, 2008, which are hereby incorporated by reference herein in its entirety.

What is claimed is:

1. An image processing apparatus comprising:
an obtaining unit configured to obtain image data from a detachable memory unit;
a control unit configured to execute predetermined screen processing on the image data obtained by the obtaining unit; and
a presuming unit configured to estimate whether the image data stored in the detachable memory unit is image data read by a scanner based on a relationship between a vertical length and a lateral length of the image data obtained by the obtaining unit and a relationship between a vertical length and a lateral length of a regular-size sheet,
wherein in a case where the presuming unit estimates that the image data stored in the detachable memory unit is image data read by the scanner, the control unit does not execute the predetermined screen processing on the image data obtained by the obtaining unit.

2. The image processing apparatus according to claim 1, wherein the presuming unit estimates whether the image data stored in the detachable memory unit is image data read by the scanner by determining whether the image data is associated with information indicating that the image data stored in by the detachable memory unit is image data captured by an imaging apparatus, and the control unit does not execute the predetermined screen processing on the image data obtained by the obtaining unit in a case where the presuming unit estimates that the image data is associated with the information indicating that the image data is image data captured by the imaging apparatus and the image data stored in the detachable memory unit is not image data read by the scanner.

3. The image processing apparatus according to claim 1, wherein the control unit selectively executes the predetermined screen processing and error diffusion processing, and
in a case where the predetermined screen processing is not executed on the image data, the control unit executes the error diffusion processing on the image data.

4. The image processing apparatus according to claim 3, further comprising:
a printing unit configured to execute printing based on the image data on which the error diffusion processing is executed.

5. The image processing apparatus according to claim 1, further comprising
a printing unit configured to print the image data; and
a receiving unit configured to receive a reprint instruction of the image data printed by the printing unit in a case where the image data obtained by the obtaining unit is printed by the printing unit,
wherein in a case where the receiving unit receives the reprint instruction, the control unit executes the error diffusion processing on the image data that is designated by the reprint instruction to print the image data.

6. An image processing apparatus comprising: an obtaining unit configured to obtain image data from a detachable memory unit;
a control unit configured to execute predetermined screen processing on the image data obtained by the obtaining unit; and
a presuming unit configured to estimate whether the image data stored in the detachable memory unit is image data read by a scanner based on a type of the detachable memory unit,
wherein in a case where the presuming unit estimates that the image data stored in the detachable memory unit is image data read by the scanner, the control unit does not execute the predetermined screen processing on the image data obtained by the obtaining unit.

7. An image processing apparatus according to claim 6, wherein
the presuming unit estimates that the image data stored in the detachable memory unit is image data read by the scanner in a case where the detachable memory unit is a predetermined type of the detachable memory unit, and
the presuming unit estimates that the image data stored in the detachable memory unit is not image data read by the scanner in a case where the detachable memory unit is not the predetermined type of the detachable memory unit.

8. The image processing apparatus according to claim 7, wherein the predetermined type of the detachable memory unit is a USB flash memory.

9. An image processing apparatus comprising: an obtaining unit configured to obtain image data from a detachable memory unit;
a control unit configured to execute predetermined screen processing on the image data obtained by the obtaining unit; and
a presuming unit configured to estimate whether the image data stored in the detachable memory unit is image data read by a scanner by determining whether a file name corresponding to the image data stored in the detachable memory unit is a file name that is automatically allocated to image data by an imaging apparatus upon generation of the image data,
wherein the control unit executes the predetermined screen processing on the image data obtained by the obtaining unit in a case where the presuming unit estimates that the image data stored in the detachable memory unit is not image data read by the scanner, and
wherein the control unit does not execute the predetermined screen processing on the image data obtained by the obtaining unit in a case where the presuming unit estimates that the image data stored in the detachable memory unit is image data read by the scanner.

10. A method for controlling an image processing apparatus comprising:
obtaining image data from a detachable memory unit;
estimating whether the image data stored in the detachable memory unit is image data read by a scanner based on a relationship between a vertical length and a lateral length of the obtained image data and a relationship between a vertical length and a lateral length of a regular-size sheet; and
executing, in a case where it is estimated that the image data stored in the detachable memory unit is not image data read by the scanner, predetermined screen processing on the obtained image data,
wherein, in a case where it is estimated that the image data stored in the detachable memory unit is image data read by the scanner, the predetermined screen processing is not executed on the obtained image data.

11. The method according to claim 10, further comprising:
estimating whether the image data stored in the detachable memory unit is image data read by the scanner by determining whether the image data is associated with information indicating that the image data stored in the detachable memory unit is image data captured by an imaging apparatus; and
executing the predetermined screen processing on the obtained image data in a case where it is estimated that the image data is associated with the information indicating that the image data stored in the detachable memory unit is image data captured by the imaging apparatus and the image data is not image data read by the scanner.

12. The method according to claim 10, further comprising:
selectively executing the predetermined screen processing and error diffusion processing; and
in a case where the predetermined screen processing is not executed on the image data, performing control for executing the error diffusion processing on the image data.

13. The method according to claim 10, further comprising:
in a case where the obtained image data is printed by a printing unit of the image processing apparatus, receiving a reprint instruction of the image data printed by the printing unit; and
executing error diffusion processing on the image data that is designated by the reprint instruction in a case where the reprint instruction is received.

14. A method for controlling an image processing apparatus, comprising:
obtaining image data from a detachable memory unit;
estimating whether the image data stored in the detachable memory unit is image data read by a scanner based on a type of the detachable memory unit; and
executing, in a case where it is estimated that the image data stored in the detachable memory unit is not image data read by the scanner, predetermined screen processing on the obtained image data,
wherein, in a case where it is estimated that the image data stored in the detachable memory unit is image data read by the scanner, the predetermined screen processing is not executed on the obtaining image data.

15. A method for controlling an image processing apparatus, comprising:
obtaining image data from a detachable memory unit;
estimating whether the image data stored in the detachable memory unit is image data read by a scanner by determining whether a file name corresponding to the image data stored in the detachable memory unit is a file name that is automatically allocated to the image data by an imaging apparatus upon generation of the image data; and
executing the predetermined screen processing on the image data in a case where it is estimated that the image data stored in the detachable memory unit is not image data read by the scanner,
wherein the predetermined screen processing is not executed on the obtained image data in a case where the presuming unit estimates that the image data stored in the detachable memory unit is image data read by the scanner.

16. A non-transitory computer-readable recording medium storing a computer-executable program for controlling an image processing apparatus, the computer-executable program comprising:
a code to obtain image data from a detachable memory unit;
a code to estimate whether the image data stored in the detachable memory unit is image data read by a scanner based on a type of the detachable memory unit; and
a code to execute, in a case where it is determined that the image data stored in the detachable memory unit is not image data read by the scanner, predetermined screen processing on the obtained image data,
wherein the predetermined screen processing is not executed on the obtained image data in a case where it is estimated that the image data stored in the detachable memory unit is image data read by the scanner.

17. An image processing apparatus comprising:
an obtaining unit configured to obtain image data from a detachable memory unit;
a control unit configured to execute predetermined screen processing on the image data obtained by the obtaining unit; and
a determining unit configured to determine whether the detachable memory unit is a predetermined type of the detachable memory unit,
wherein in a case where the determining unit determines that the detachable memory unit is the predetermined type of the detachable memory unit, the control unit does not execute the predetermined screen processing on the image data obtained by the obtaining unit.

18. The image processing apparatus according to claim 17, wherein in a case where the determining unit determines that the detachable memory unit is not the predetermined type of the detachable memory unit, the control unit executes the predetermined screen processing on the image data obtained by the obtaining unit.

19. The image processing apparatus according to claim 18, wherein the predetermined type of the detachable memory unit is a USB flash memory.

20. The image processing apparatus according to claim 17, wherein the control unit selectively executes the predetermined screen processing and error diffusion processing, and In a case where the predetermined screen processing is not executed on the image data, the control unit executes the error diffusion processing on the image data.

21. The image processing apparatus according to claim 20, further comprising:
a printing unit configured to execute printing based on the image data on which the error diffusion processing is executed.

* * * * *